April 30, 1968     H. S. GOLDBERG ET AL     3,380,698
BICYCLE HOLDER FOR TRANSISTOR RADIOS
Filed Oct. 26, 1966
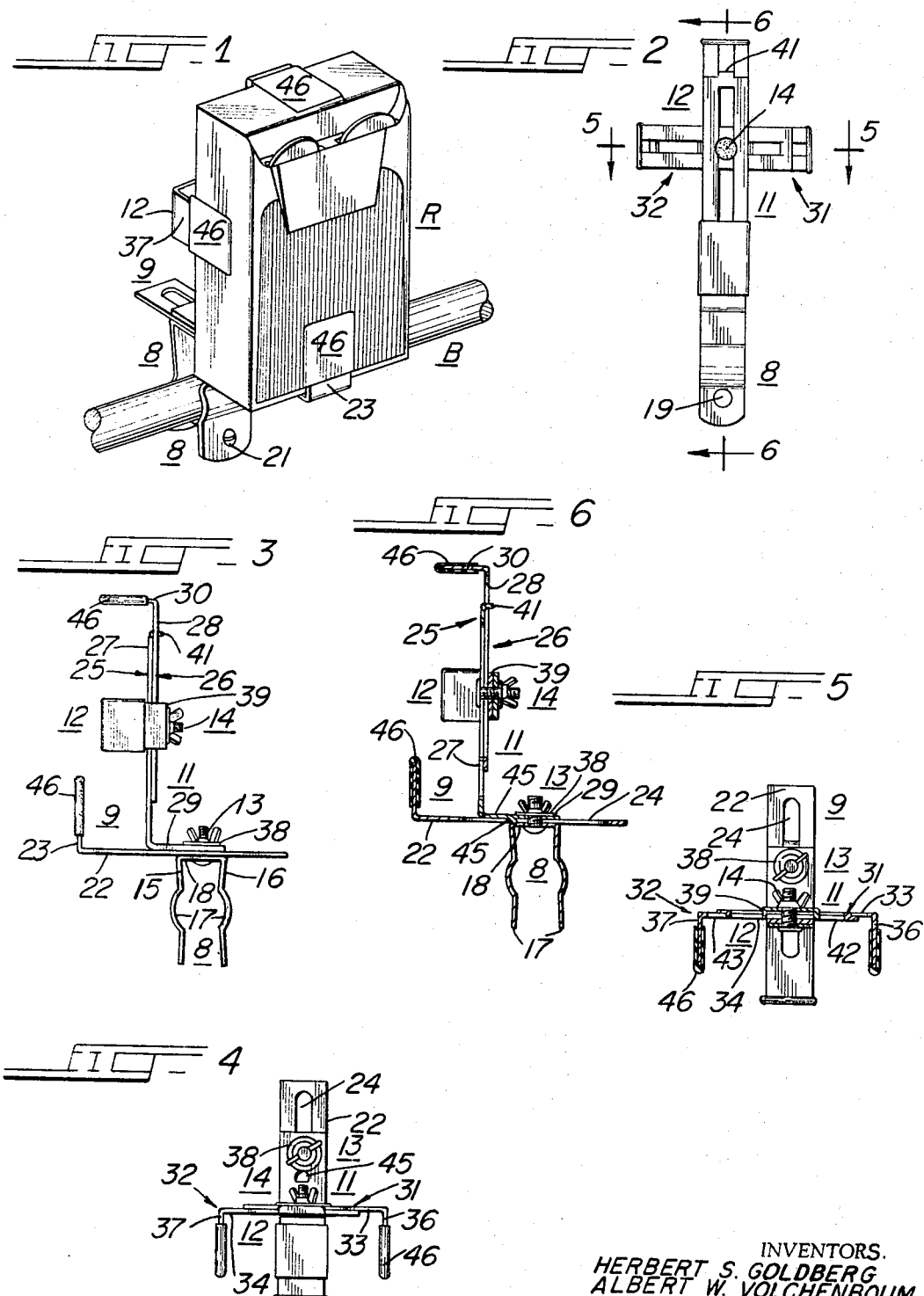
INVENTORS.
HERBERT S. GOLDBERG
ALBERT W. VOLCHENBOUM

United States Patent Office 3,380,698
Patented Apr. 30, 1968

3,380,698
BICYCLE HOLDER FOR TRANSISTOR RADIOS
Herbert S. Goldberg, 2849 W. Birchwood Ave., and Albert W. Volchenboum, 7524 N. Damen Ave., both of Chicago, Ill. 60645
Filed Oct. 26, 1966, Ser. No. 589,753
3 Claims. (Cl. 248—229)

This invention relates to a mounting for securing a small radio on a vehicle, such as a bicycle.

In these times practically all highway vehicles, exclusive of motor and foot-pedal bicycles, have radios incorporated therein. Where radios are desired for bicycles, some kind of an accessory has to be provided for the support of a radio.

One of the dangers for children when they are riding their 2-wheel bicycles, is that they are often holding the handle bar with one hand and holding a small transistor radio in the other hand close to their ear, sometimes resting the hand on the shoulder with the speaker of the radio close to the ear. Thus the rider is concentrating more on what he is hearing on the radio than paying attention to riding his bicycle. As a result of such inattention and one-handed operation of the bicycle there is a great deal of chance for accidents. It is to overcome this inherent danger to children riding their bicycles, using one hand to steer and balance themselves and the other holding the transistor radio, that the present invention was conceived.

The main objects of this invention are; to provide an improved form of carrier for mounting a radio to a bicycle; and to provide an improved radio carrier of this kind of such simple structure as to make highly economical the manufacturing and marketing thereof and extremely simple the attachment of a small radio to the bicycle.

In the adaptation shown in the accompanying drawing;

FIG. 1 is a front perspective of a small-type radio clamped in a carrier constructed in accordance with this invention;

FIG. 2 is a front view of the carrier per se, indicated in FIG. 1;

FIG. 3 is a side elevational view of what is shown in FIG. 2;

FIG. 4 is a top view of what is shown in FIG. 2;

FIG. 5 is a plan sectional view of the carrier taken on the plane of the line 5—5 of FIG. 2; and FIG. 6 is a vertical sectional view of the carrier taken on the plane of the line 6—6 of FIG. 2.

The essential concept of this invention involves two pairs of superimposed brackets structured for relative longitudinal shifting within predetermined limits to embracively support a small size radio, one pair of the brackets being attached transversely to the other pair for longitudinal shifting thereon with the other pair of brackets adjustably attached to a supporting element for fixed positioning on the bicycle.

A radio carrier embodying the foregoing concept comprises a supporting element 8, a member 9, a first pair of brackets 11 and a second pair of brackets 12 all held in relatively-adjustable relationship by two bolt-nut combinations 13 and 14 on the handle-bar B of a bicycle, not shown. A small-size radio R of the type commonly designated as a "pocket" radio is mounted thereon.

The support element here is shown as a U-shaped spring metal clip. The parallel arms 15 and 16 have opposed, slightly-curved medial portions 17 for embracing the handle-bar B of a bicycle, the base 18 of which has an aperture for the insertion of the bolt of the first bolt-nut combination 13. The ends of the arms 15–16 have opposed apertures 19 (FIG. 2) formed therein for the insertion of a supplemental bolt-nut combination 21 (FIG. 1) for securing the element 8 in place on a handle-bar B.

The member 9, as here shown, is of L-shape in form and formed of a narrow strip, about three-quarter inch wide strap metal. The longer and shorter normally-disposed arms 22 and 23 are about 3¼ and 1½ inches long respectively. A slot 24 extends medially along the longer arm 22.

The first pair of brackets 11 are disposed vertically above the member 9 and comprise two L-shaped parts 25 and 26 with the longer slotted arms 27 and 28 contactively overlapping and the respective shorter arms 29 and 30 extending in opposite directions normal to the common plane of the arms 27 and 28 (FIGS. 3 and 6).

The second pair of brackets 12, which in use are horizontally disposed, comprise two L-shaped parts 31 and 32 with the longer slotted arms 33 and 34 contactively overlapping and the shorter arms 36 and 37 extending in the same direction normal to the common plane of the arms 33 and 34 (FIGS. 2, 4 and 5).

The parts 25 and 26 and 31 and 32, of these two pairs of brackets 11 and 12, are formed of strap metal substantially of the same gage and dimensions as the member 9.

The two bolt-nut combinations 13 and 14 here are shown as of conventional rounded-head bolt and winged-nut type. Washers 38 and 39 are interposed between the respective nuts and the bracket arms. The washer 39 is of special form as will be explained presently.

To ensure the pairs of brackets 11 and 12 not being accidentally separated from their assembled relationship, various forms of ears are integrated with bracket arm 27 and the bracket arms 33 and 34 and with the washer 38.

An ear 41 of T-shape is formed at the extremity of the arm 27 to extend through the slot in the arm 28 (FIGS. 2, 3 and 6.) The stem part of this T-shaped ear 41 extends through the slot in the arm 28 to dispose the head in transverse contact with the opposite face of the arm 28.

Ears 42 and 43, integrated with the extremities of the arms 33 and 34 of the pair of brackets 12, extend into the opposite slots to contact the outer ends of the slots when the brackets are relatively contracted and contacting the ears 44 on the washer 30 when the arms 33 and 34 of the pair of brackets 12 are extended.

A lug 45 is depressed from the short arm 29 of the member 9. (See FIGS. 4 and 6.) This extends into the slot 24 in the long arm 22 of the member 9. This ensures against any relative rotational shifting of the pair of brackets 11 on the member 9 at any time in their assembled relationship.

In the use of this radio carrier, the wing nuts of the two bolt-nut combinations 13 and 14 are retracted sufficiently to permit the pairs of brackets 11 and 12 to be shifted into positions to embrace a radio R, as shown in FIG. 1. This will bring the back of the radio against the pair of brackets 11 with the pair of brackets 12 disposed transversely of the radio. These pairs of brackets 11 and 12 then are adjusted to bring the respective short arms thereof, with their protective pads 46, into contact with the perimetrical portions of the front and sides of the radio as clearly indicated in FIG. 1. The wing nuts of the respective combinations 12 and 13 then are tightened to firmly secure the radio R to the carrier. The element 8 then may be set over a handle-bar B and the bolt-nut combination 21 tightened to firmly fix the position of the radio for its desired use on the bicycle.

Although but one specific embodiment of this invention is herein shown and described, it will be understood that numerous details of the construction shown may be altered or omitted without departing from the spirit of the invention as defined by the following claims.

We claim:
1. A radio-carrier, for mounting on a vehicle, comprising,
(a) a supporting element structured for fixed attachment to the vehicle,
(b) an L-shaped member having a slot extending longitudinally of the longer arm thereof,
(c) a first pair of overlapping L-shaped brackets each having a slot extending longitudinally of the longer arm of each thereof, and a hole in the shorter arm of one of the brackets which shorter arm is disposed oppositely to the shorter arm on the other bracket,
(d) a second pair of overlapping L-shaped brackets each having a slot extending longitudinally of the longer arm thereof, and with the shorter arms extending in the same direction,
(e) a first bolt-nut combination for extending through the slot in the L-shaped member and through the hole in the short arm of the one of the first pair of brackets for securing the L-shaped member in adjusted position on the supporting element to dispose the short arm of member in predetermined spaced disposition relative to the first pair of L-shaped brackets, and anchoring the short arm of the one of the first pair of L-shaped members to the supporting element, and
(f) a second bolt-nut combination for extending through the slots in both pairs of brackets to clamp each pair in their relatively adjustable relationships and the pairs relatively adjustable to each other for relative disposition to clamp a radio between the short arms of the member and the two pairs of brackets.

2. A radio-carrier as set forth in claim 1 wherein
(g) a lug formed on the shorter arm of the one of the first pair of brackets for extending into the slot in the longer arm of the member to secure that pair of brackets against shifting transversely relative to the slotted arm of the member,
(h) ears formed on the extremities of the slotted arm of one of the first pair of brackets, and formed on each of the slotted arms of the second pair of brackets and seated in the slots of the respective other brackets to limit the relatively extended shifting of the respective pairs of brackets, and
(i) a stop fixed on one bracket of the first pair for limiting the relative extension of the first pair of brackets.

3. A radio-carrier as set forth in claim 2 wherein the supporting element is in the form of a U-shaped spring clip to which the L-shaped member and one of the first pair of L-shaped brackets are anchored by the first bolt-nut combination to the handle.

References Cited
UNITED STATES PATENTS

| | | | |
|---|---|---|---|
| 959,735 | 5/1910 | Hancock | 248—316 XR |
| 1,631,355 | 6/1927 | Baldwin | 248—229 XR |
| 2,062,156 | 11/1936 | Zerbst | 248—229 |
| 2,538,449 | 1/1951 | Freshwater | 248—229 XR |

ROY D. FRAZIER, *Primary Examiner.*

R. P. SEITTER, *Assistant Examiner.*